United States Patent Office 2,806,029

Patented Sept. 10, 1957

1

2,806,029

3-OXYGENATED 12a-AZA-C-HOMOPREGNANE-12,20-DIONES AND CONGENERS

Robert H. Mazur, Evanston, Ill., assignor to G. D. Searle & Co., Chicago, Ill., a corporation of Delaware No Drawing. Application July 16, 1956, Serial No. 597,859

7 Claims. (Cl. 260—239.3)

This invention relates to 12a-aza-C-homopregnane-12,20-diones variously oxygenated in the 3-position, to congeneric analogs thereof, and to processes for the manufacture of these 3-oxygenated 12a-aza-C-homopregnane-12,20-diones and congeners. In particular, this invention relates to compounds of the formula

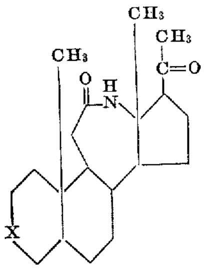

and to the 16-dehydro, 16,17-epoxy, and 17-hydroxy compounds corresponding thereto, X in the formulas for these compounds being a hydroxymethylene (lower alkanoyl)-oxymethylene, or carbonyl radical. The 16-dehydro compounds comprehended have the formula

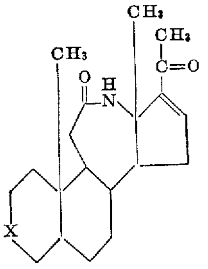

the 16,17-epoxy compounds the formula

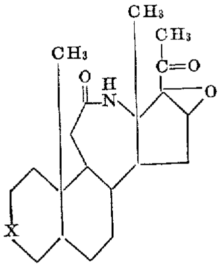

and the 17-hydroxy compounds the formula

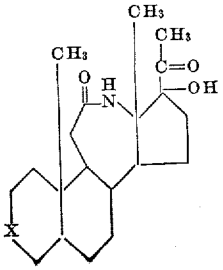

2

By "lower alkanoyl" in the foregoing formula is meant $$-\overset{\displaystyle O}{\overset{\|}{C}}-\text{lower alkyl}$$

the lower alkyl radicals contemplated being methyl, ethyl, propyl, isopropyl, butyl, isobutyl, sec-butyl, tert-butyl, pentyl, sec-n-pentyl, primary isopentyl, sec-isopentyl, tert-pentyl, hexyl, and similar $C_nH_{2n+1}$ radicals such that $n$ is a positive integer amounting to less than 7.

Nomenclature of the compounds herein disclosed is based on recommendations to the International Union of Pure and Applied Chemistry by its Commission on Biological Nomenclature, a report of which is published in the June 23, 1951, issue of Chemistry and Industry.

Not only are the compounds of this invention closely related chemically, but also they are characterized by common, useful, pharmacological properties. Especially, the claimed compounds share a desirable anti-hormonal activity. Thus, for example, when administered conjointly with cortisone, they inhibit the harmful deposition of liver glycogen brought about by this widely accepted medicament—apparently without adversely affecting its therapeutic function.

The compounds to which this invention relates are relatively insoluble in water, but may be dissolved in one or more of such common organic solvents as alcohol, ethyl acetate, chloroform, and dioxane. The compounds may be administered in solid form as tablets; dissolved or suspended in aqueous media, they may be given parenterally.

Manufacture of the compounds of this invention may be variously accomplished, but a preferred procedure starts with hecogenin acetate, the oxime of which is prepared and subjected to Beckmann rearrangement to the corresponding 12a-aza-C-homo-5α-spirostan. This, in turn, is degraded to a claimed 16-dehydro 3-ester by seriatim treatment with acetic anhydride, chromic oxide, and sodium acetate. The ester thus obtained may be saponified to give the 16-dehydro alcohol of the claims—convertible, ad libitum, to any 16-dehydro 3-ester of the invention by interaction with an appropriate acid anhydride or chloride according to usual techniques—or, alternatively, the dehydro 3-acetate may be hydrogenated—for example, over palladium on carbon in acetic acid solution—to give the corresponding claimed dihydro compound. This material, like the dehydro 3-acetate, is amenable to (preferably) alkaline hydrolysis, following which one may convert to an ester of choice as set forth above. Alternatively, the 16,17-dihydro alcohol obtained in the contemplated hydrolysis may be oxidized to the corresponding 3-ketone of the claims by treatment with hypochlorite and subsequent reductive (using sodium bisulfite or the equivalent) restoration of the N-hydrogen atom replaced by chlorine during the oxidative transformation. The 16,17-epoxy (3-)alcohol of this invention is derived from the 16- dehydro 3-acetate by contacting with alkaline peroxide, and may be esterified, or oxidized to the epoxy 3-ketone hereof, by the same techniques useful for introducing ester and oxo groupings into the claimed 16,17-dihydro alcohol. Finally, the (3,17-)diol defined by the claims is a product of the consecutive treatment—in solvent media—of the aforesaid epoxy alcohol with hydrobromic acid and hydrogen, the hydrogenation being carried out in the presence of a catalyst such as palladium on calcium carbonate. The diol, like the epoxy and 16,17-dihydro alcohols of this invention, may be converted to the corresponding claimed 3-oxo compound with hypochlorite.

The following examples describe in detail certain of the compounds illustrative of this invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.) and relative amounts of materials in parts by weight, except as otherwise noted.

*Example 1*

*3β-acetoxy-5α-spirostan-12-one oxime.*—A solution of 20 parts of hecogenin acetate and 4 parts of hydroxylamine hydrochloride in 200 parts of pyridine is heated at reflux temperatures for 2 hours. The reaction mixture is then dumped into a large volume of water, precipitating 3β-acetoxy-5α-spirostan-12-one oxime. The product is filtered out and crystallized from a mixture of alcohol and chloroform as transparent plates, which melt at approximately 312° C. The product has the formula

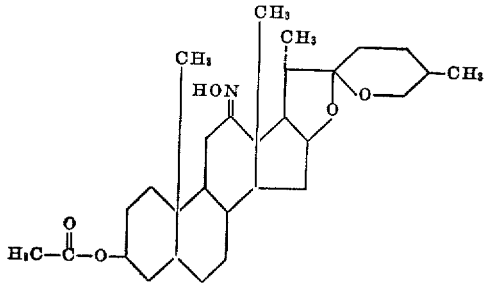

*Example 2*

*3β-acetoxy-12a-aza-C-homo-5α-spirostan-12-one.* — A solution consisting of 10 parts of the oxime of Example 1 and 10 parts of p-toluenesulfonyl chloride in 100 parts of dry pyridine is heated at approximately 90° C. for 3 hours. The solution is then cooled, diluted with 10 parts of water, and let stand for 1 hour to permit decomposition of excess acid chloride. Chloroform is next added, following which the organic phase is washed first with dilute muriatic acid (to remove pyridine) and then with dilute aqueous sodium bicarbonate. Finally, the organic phase is dried over anhydrous sodium sulfate and subsequently stripped of solvent by vacuum distillation. The residue is chromatographed on silica gel, using benzene and ethyl acetate as developing solvents. Recrystallization of the purified product thus obtained from 50% aqueous alcohol affords 3β-acetoxy-12a-aza-C-homo-5α-spirostan-12-one as long, flat prisms having a double melting point at 190° and 230–231° C., with resolidification thereinbetween. The product has the formula

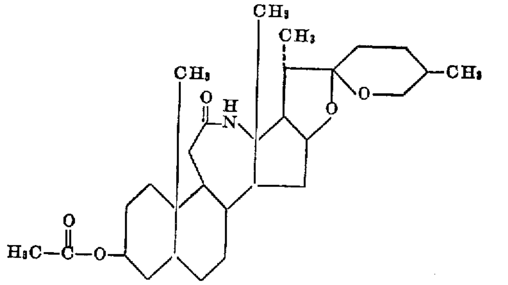

*Example 3*

*3β - acetoxy - 12a-aza-C-homo-5α-pregn-16-ene-12,20-dione.*—A solution of a 140 parts of 3β-acetoxy-12a-aza-C-homo-5α-spirostan-12-one and 40 parts of pyridine hydrochloride in 1000 parts of acetic anhydride is refluxed at the boiling point for 6 hours. Approximately 250 parts of water is then mixed into the cooled solution at a rate such that temperatures do not exceed 35° C. Hydrolysis of excess acetic anhydride having thus been effected, the solution is next cooled at 10° C., following which 77 parts of chromic oxide in 77 parts of water is introduced at a rate such that temperatures remain below 15° C. The reaction mixture is let stand, with agitation, at 10–15° C. for one half-hour, whereupon 49 parts of 36% aqueous formaldehyde and 280 parts of sodium acetate are added. The resultant mixture is heated at 100–105° C. with agitation for 1 hour, during which time the sodium acetate dissolves and excess chromic oxide is reduced by the formaldehyde. Finally, the solution is cooled, diluted with water, and extracted with chloroform, in that order. The chloroform extract is stripped of solvent by vacuum distillation, and the residue is chromatographed on silica gel, using benzene and ethyl acetate as developing solvents. Crystallization of the 3β - acetoxy - 12a-azo-C-homo-5α-pregn-16-ene-12,20-dione thus obtained from a mixture of benzene and cyclohexane affords the product as thick prisms melting at approximately 199–200° C. The product has the formula

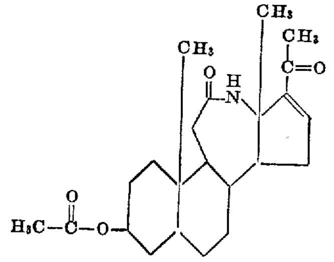

*Example 4*

*12a - aza - 3β-hydroxy-C-homo-5α-pregn-16-ene-12,20-dione.*—Saponification of the dehydro 3-acetate of the foregoing Example 3 is achieved by dissolving 1 part of the said ester and 1 part of caustic potash in 20 parts of 60% aqueous dioxane, then heating this solution for one half-hour at approximately 90° C. Neutralization of the solution with acetic acid, followed by vacuum concentration to the cloud point, gives 12a-aza-3β-hydroxy-C-homo-5α-pregn-16-ene-12,20-dione of the formula

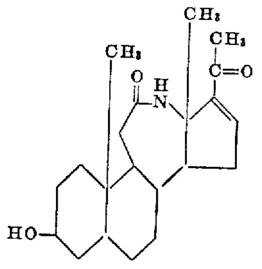

*Example 5*

*3-Acetoxy-12a-aza-C-homo-5α-pregnane-12,20-dione.*—A mixture of 20 parts of the dehydro-3-acetate of Example 3, 200 parts of glacial acetic acid, and 3 parts of pre-reduced 5% palladium on carbon is agitated at room temperature under hydrogen at atmospheric pressure until reduction of the double bond at carbon number 16 is complete. After removal of the catalyst by filtration, and dilution of the filtrate with water, the product is extracted into chloroform. The cholorform extract is stripped of solvent by distillation in vacuo, whereupon the residue is crystallized from aqueous alcohol. 3β-acetoxy-12a-aza-C-homo-5α-pregnane-12,20-dione is obtained by this means as irregular prisms melting at approximately 196° C. The product has the formula

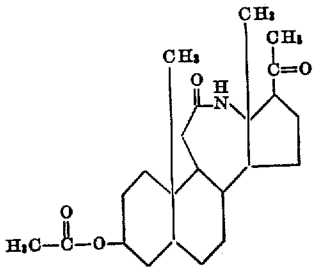

Example 6

*12a-aza-3β-hydroxy-C-homo-5α-pregnane-12,20-dione.*—To a solution of 8 parts of 3β-acetoxy-12a-aza-C-homo-5α-pregnane-12,20-dione in 40 parts of alcohol is added 8 parts of caustic potash dissolved in 16 parts of water. The resultant solution is let stand at room temperatures for approximately 3 hours, following which it is neutralized with acetic acid and then diluted with approximately 40 parts of water. Concentration under reduced pressure at approximately 90° C. to the point of cloudiness, and subsequent chilling, causes separation of the desired 12a-aza-3β-hydroxy-C-homo-5α-pregnane-12,20-dione as long needles melting at 187–190° C. The product has the formula

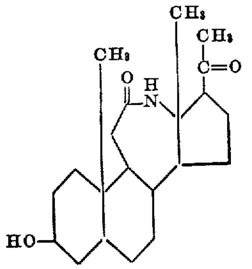

Example 7

*12a-aza-C-homo-5α-pregnane-3,12,20-trione.*—A solution of 1 part of 12a-aza-3β-hydroxy-C-homo-5α-pregnane-12,20-dione in 20 parts of tert-butyl alcohol is combined with 1 part of tert-butyl hypochlorite and maintained thus at room temperatures for 4 hours. Approximately 10 parts of water is next introduced, following which the reaction mixture is cooled to around 10° C. and excess hypochlorite is then decomposed by the slow addition of aqueous sodium bisulfite. The product is extracted with chloroform, and the chloroform extract is stripped of solvent by distillation in vacuo. The residue is chromatographed on silica gel. Elution with a mixture consisting of 4 parts of ethyl acetate and 1 part of benzene affords 12a-aza-C-homo-5α-pregnane-3,12,20-trione which crystallizes from aqueous methyl alcohol as small prisms melting at 177–178° C. The product has the formula

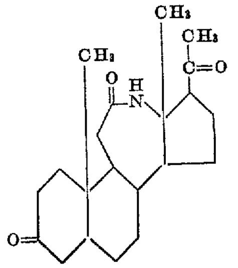

Example 8

*12a-aza-16α,17α-epoxy-3β-hydroxy-C-homo-5α-pregnane-12,20-dione.*—To 10 parts of the dehydro 3-acetate of Example 3 disolved in 200 parts of tert-butyl alcohol is added 5 parts of caustic potash dissolved in 40 parts of water. Approximately 33 parts of 30% aqueous hydrogen peroxide is then introduced. The resultant mixture is maintained with vigorous agitation for about 16 hours at room temperature. Sufficient acetic acid is next added to neutralize the reaction mixture, which is then extracted with an equi-volume mixture of ether and benzene. Solvent is stripped from the extract by vacuum distillation, the residue being crystallized from aqueous methyl alcohol to give 12a-aza-16α,17α-epoxy-3β-hydroxy-C-homo-5α-pregnane-12,20-dione as coarse needles melting at approximately 155° and 256–257° C., with resolidification thereinbetween. The product has the formula

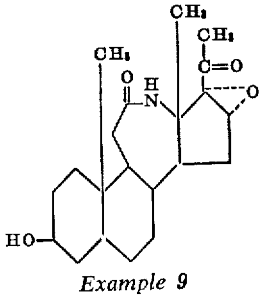

Example 9

A. *12a-aza-N-chloro-16-α-17α-epoxy-C-homo-5α-pregnane-3,12,20-trione.*—To a solution of 1 part of the epoxy alcohol of the preceding Example 8 in 15 parts of tert-buty alcohol is added 1 part of tert-butyl hypochlorite. The resultant solution is allowed to stand at room temperatures for 1 hour, during which time crystallization of product takes place. The 12a-aza-N-chloro-16α,17α-epoxy-C-homo-5α-pregnane-3,12,20-trione thus obtained melts at 215–225° C. and gives a test for positive halogen. The product has the formula

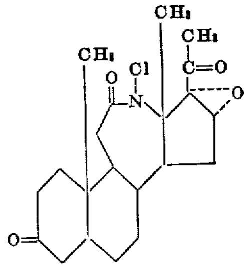

B. *12a-aza-16α - 17α - epoxy - C - homo-5α-pregnane-3,12,20-trione.*—A mixture of 4 parts of the chlorolactam of the preceding part A of this example, 2 parts of potassium acetate, and 40 parts of glacial acetic acid is heated at approximately 90° C. while 2 parts of sodium bisulfite is added in small increments, the reactants being vigorously agitated throughout the course of the addition. Starting material dissolves as reduction takes place. When all of the sodium disulfite has been added and solution is complete, the reaction mixture is cooled and diluted with water. Extraction into chloroform and subsequent stripping of solvent by distillation in vacuo affords a residue which is purified by chromatography on silica gel. Elution wtih a mixture consisting of 2 parts ethyl acetate and 3 parts of benzene affords 12a-aza - 16α,17α-epoxy-C-homo-5α-pregnane-3,12,20-trione, which crystallizes from aqueous methyl alcohol as tiny needles melting at 236–239° C. The product has the formula

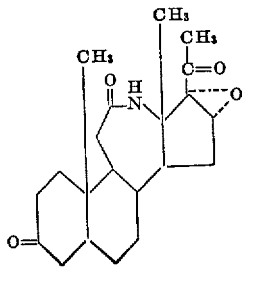

*Example 10*

A. *3β-acetoxy-12a-aza-16β-bromo-17α-hydroxy-C-homo-5α-pregnane-12,20-dione.*—A solution of 10 parts of the epoxy alcohol of Example 8 in 200 parts of glacial acetic acid is heated with 20 parts of 32% hydrobromic acid in acetic acid, the temperature being maintained at 55° C. for 5 hours. The reaction mixture is cooled at this point and dumped into a large volume of water, precipitating 3β-acetoxy-12a-aza-16β-bromo-17α-hydroxy-C-homo-5α-pregnane-12,20-dione, which is recovered by filtration. The product melts at approximately 175–180° C. It has the formula

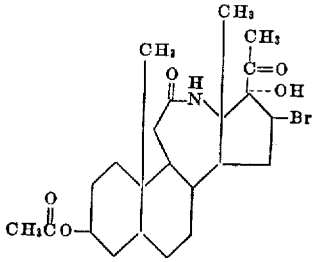

B. *12a-aza-3β,17α-dihydroxy-C-homo-5α-pregnane-12,20-dione.*—A mixture of 4 parts of the bromohydrin of the preceding part A of this example with 200 parts of 95% alcohol and 4 parts of pre-reduced 5% palladium on calcium carbonate is agitated at room temperatures under hydrogen at atmospheric pressure during 36 hours, the system being flushed with hydrogen at 12-hour intervals to remove accumulated gaseous by-products. The catalyst is then removed by filtration, whereupon 12 parts of caustic potash dissolved in 36 parts of water is added to the filtrate. The resultant solution is allowed to stand at room temperatures for 3 hours, then neutralized with acetic acid, and finally diluted with water. A chloroform extraction is effected, following which solvent is removed by vacuum distillation. The residue crystallizes from aqueous methyl alcohol in clusters of thick needles having a double melting point of 175–180° C. and 260–261° C., with resolidification thereinbetween. The material thus obtained is 12a-aza-3β,17α-dihydroxy-C-homo-5α-pregnane-12,20-dione. It has the formula

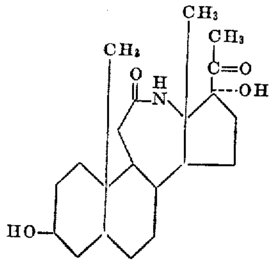

*Example 11*

*12a-aza-17α-hydroxy-C-homo-5α-pregnane-3,12,20-trione.*—Using the procedure detailed in Example 7, 2 parts of tert-butyl hypochlorite is added to 2 parts of 12a-aza-3β,17α-dihydroxy-C-homo-5α-pregnane-12,20-dione dissolved in 38 parts of tert-butyl alcohol, and the resultant mixture is allowed to stand for 3½ hours at room temperatures. Approximately 20 parts of water is then introduced, and the mixture is thereupon cooled to around 10° C. Excess hypochlorite is decomposed with aqueous sodium bisulfite, following which a chloroform extraction is carried out. The chloroform extract is stripped of solvent by distillation in vacuo. Crystallization of the residue from aqueous methyl alcohol affords pure 12a-aza-17α-hydroxy-C-homo-5α-pregnane-3,12,20-trione as gleaming plates which melt at 285–287° C. The product has the formula

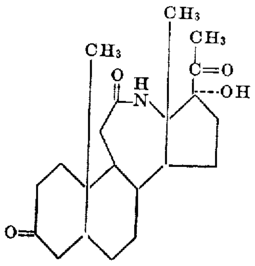

What is claimed is:

1. A compound selected from the group consisting of compounds of the formula

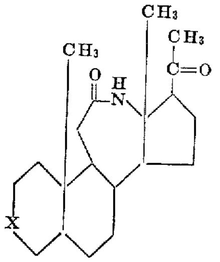

and 16-dehydro, 16,17-epoxy, and 17-hydroxy compounds corresponding thereto, X in the formula for these compounds being selected from the group consisting of hydroxymethylene, (lower alkanoyl)oxymethylene, and carbonyl radicals.

2. 12a-aza-3β-hydroxy-C-homo-5α-pregnane-12,20-dione.

3. A compound of the formula

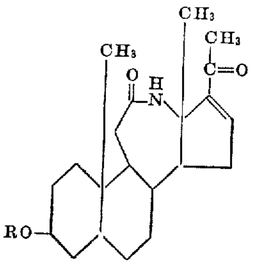

wherein R is a lower alkanoyl radical.

4. 3β-acetoxy-12a-aza-C-homo-5α-pregn-16-ene-12,20-dione.

5. 12a-aza-16α,17α-epoxy-3β-hydroxy-C-homo-5α-pregnane-12,20-dione.

6. 12a-aza-C-homo-5α-pregnane-3,12,20-trione.

7. 12a-aza-3β,17α-dihydroxy-C-homo-5α-pregnane-12,20-dione.

No references cited.

UNITED STATES PATENT OFFICE

Certificate of Correction

Patent No. 2,806,029 September 10, 1957

Robert H. Mazur

It is hereby certified that error appears in the printed specification of the above numbered patent requiring correction and that the said Letters Patent should read as corrected below.

Column 3, line 7, strike out "15"; column 4, line 14, for "-12a-azo-C-" read —-12a-aza-C-—; line 62, Example 5, in the heading, for "*3-Acetoxy-*" read —*3β-acetoxy-*—; column 6, line 26, for "buty" read —butyl—.

Signed and sealed this 28th day of January 1958.

[SEAL]

Attest:

KARL H. AXLINE,
*Attesting Officer.*

ROBERT C. WATSON,
*Commissioner of Patents.*